United States Patent
Kato (10) Patent No.: US 7,734,630 B2
(45) Date of Patent: Jun. 8, 2010

(54) PROGRAM, DATA PROCESSING METHOD AND DATA PROCESSING APPARATUS

(75) Inventor: Junji Kato, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/518,992

(22) PCT Filed: Apr. 16, 2004

(86) PCT No.: PCT/JP2004/005453

§ 371 (c)(1),
(2), (4) Date: Aug. 26, 2005

(87) PCT Pub. No.: WO2004/095317

PCT Pub. Date: Nov. 4, 2004

(65) Prior Publication Data

US 2006/0015193 A1    Jan. 19, 2006

(30) Foreign Application Priority Data

Apr. 24, 2003    (JP)    ............................. 2003-120390

(51) Int. Cl.
G06F 17/30    (2006.01)
(52) U.S. Cl. ...................................... 707/748; 707/749
(58) Field of Classification Search ............... 707/1–10, 707/100–104.1, 200–206; 705/35, 14, 26, 705/36 R, 1, 46; 455/556.1; 715/721, 200, 715/838; 725/46, 112
See application file for complete search history.

(56) References Cited

U.S. PATENT DOCUMENTS

| | | | |
|---|---|---|---|
| 6,014,654 A | | 1/2000 | Ariyoshi |
| 2002/0010625 A1 * | | 1/2002 | Smith et al. .................... 705/14 |
| 2003/0093790 A1 * | | 5/2003 | Logan et al. .................. 725/38 |
| 2003/0163399 A1 * | | 8/2003 | Harper et al. .................. 705/35 |
| 2003/0182277 A1 * | | 9/2003 | Kurakake ....................... 707/3 |
| 2004/0103092 A1 * | | 5/2004 | Tuzhilin et al. ................. 707/3 |
| 2004/0114571 A1 * | | 6/2004 | Timmins et al. ............. 370/352 |
| 2004/0128317 A1 * | | 7/2004 | Sull et al. ................. 707/104.1 |

(Continued)

FOREIGN PATENT DOCUMENTS

JP    9-265478 A    10/1997

(Continued)

OTHER PUBLICATIONS

Kazuma Ando, "Recommendation system, when this year begins the number of products are going to double, choose by the characteristics of the contents and the business policy", Nikkei Internet technology, vol. 51, Sep. 22, 2001, pp. 46-55.

*Primary Examiner*—Diane Mizrahi
(74) *Attorney, Agent, or Firm*—Lerner, David, Littenberg, Krumholz & Mentlik, LLP (57) ABSTRACT

A specifying portion 371 for specifying a favorite content list of other user "U" indicating same contents as those indicated by a favorite content list D_t1 of a user U_A among a plurality of favorite content lists D_t respectively indicating contents favored by respective users "U" defined by corresponding to the respective users "U"; and a recommendation list generation portion 372 for ranking based on number of respective contents indicated by the favorite content lists D_t of other users by using the favorite content list D_t1 and a favorite content lists of other users "U", and generating a recommendation content list D_r1; are provided.

7 Claims, 10 Drawing Sheets

U.S. PATENT DOCUMENTS

| | | | |
|---|---|---|---|
| 2004/0128514 A1* | 7/2004 | Rhoads | 713/176 |
| 2004/0143564 A1* | 7/2004 | Gross et al. | 707/1 |
| 2004/0205065 A1* | 10/2004 | Petras et al. | 707/5 |
| 2006/0047623 A1* | 3/2006 | Kimura et al. | 707/1 |
| 2006/0212444 A1* | 9/2006 | Handman et al. | 707/5 |
| 2006/0293909 A1* | 12/2006 | Miyajima et al. | 705/1 |
| 2007/0079333 A1* | 4/2007 | Murakami et al. | 725/46 |

FOREIGN PATENT DOCUMENTS

| | | |
|---|---|---|
| JP | 2003-76712 A | 3/2003 |

* cited by examiner

USER U_C  D_t3

| TITLE | ARTIST NAME | POINT |
|---|---|---|
| TITLE HHHH | ARTIST HH | 1 |
| TITLE AAAA | ARTIST AA | 1 |
| TITLE IIII | ARTIST II | 1 |
| TITLE JJJJ | ARTIST JJ | 1 |
| TITLE KKKK | ARTIST KK | 1 |

FIG. 6B

USER U_D  D_t4

| TITLE | ARTIST NAME | POINT |
|---|---|---|
| TITLE LLLL | ARTIST LL | 1 |
| TITLE MMMM | ARTIST MM | 1 |
| TITLE CCCC | ARTIST CC | 1 |
| TITLE JJJJ | ARTIST JJ | 1 |

FIG. 6C

USER U_A  D_r1

| RANK | TITLE | ARTIST NAME | POINT | NUMBER OF USER |
|---|---|---|---|---|
| 1 | TITLE JJJJ | ARTIST JJ | 2 | 2 |
| 2 | TITLE HHHH | ARTIST HH | 1 | 1 |
|  | TITLE AAAA | ARTIST AA | 1 | 1 |
|  | TITLE IIII | ARTIST II | 1 | 1 |
|  | TITLE KKKK | ARTIST KK | 1 | 1 |
|  | TITLE LLLL | ARTIST LL | 1 | 1 |
|  | TITLE MMMM | ARTIST MM | 1 | 1 |
|  | TITLE CCCC | ARTIST CC | 1 | 1 |

USER U_C

| TITLE | ARTIST NAME | POINT |
|---|---|---|
| TITLE HHHH | ARTIST HH | 20 |
| TITLE AAAA | ARTIST AA | 20 |
| TITLE IIII | ARTIST II | 20 |
| TITLE JJJJ | ARTIST JJ | 20 |
| TITLE KKKK | ARTIST KK | 20 |

USER U_D

| TITLE | ARTIST NAME | POINT |
|---|---|---|
| TITLE LLLL | ARTIST LL | 25 |
| TITLE MMMM | ARTIST MM | 25 |
| TITLE CCCC | ARTIST CC | 25 |
| TITLE JJJJ | ARTIST JJ | 25 |

USER U_A

| RANK | TITLE | ARTIST NAME | POINT | NUMBER OF USER |
|---|---|---|---|---|
| 1 | TITLE JJJJ | ARTIST JJ | 45 | 2 |
| 2 | TITLE LLL | ARTIST LL | 25 | 1 |
|  | TITLE MMMM | ARTIST MM | 25 | 1 |
|  | TITLE JJJJ | ARTIST JJ | 25 | 1 |
| 3 | TITLE HHHH | ARTIST HH | 20 | 1 |
|  | TITLE AAAA | ARTIST AA | 20 | 1 |
|  | TITLE IIII | ARTIST II | 20 | 1 |
|  | TITLE KKKK | ARTIST KK | 20 | 1 |

FIG. 10

PROGRAM, DATA PROCESSING METHOD AND DATA PROCESSING APPARATUS

TECHNICAL FIELD

The present invention relates to a program, a data processing method and a data processing apparatus including a function of performing data processing, for example, on data indicating user's favorites from a user terminal device.

BACKGROUND ART

For example, a data processing apparatus for providing contents, etc. that fit user's favorites based on data indicating attributes of a user (user's attributes), such as operation history of the user, has been known.

The above data processing apparatus takes account only of the user's own attributes, such as operation history, but not all favorites of the user can be perceived by the user's own attributes. Thus, those taking account of, for example, latent favorites other than user's attributes are desired.

DISCLOSURE OF THE INVENTION

An object of the present invention is to provide a program, a data processing method and a data processing apparatus capable of providing data indicating user's favorite contents which cannot be perceived only by attributes, such as user's own operation history.

To attain the above object, a first aspect of the present invention is a program executed by a data processing apparatus, including a first process for specifying other first favorites data indicating same contents as those indicated by predetermined first favorites data among a plurality of first favorites data respectively indicating contents favored by respective users defined by corresponding to the respective users; and a second process for generating second favorites data by using the predetermined first favorites data and the other first favorites data specified in the first process.

According to the first aspect, in the first process, other first favorites data indicating same contents as those indicated by predetermined first favorites data is specified among a plurality of first favorites data respectively indicating contents favored by respective users defined by corresponding to the respective users.

In the second process, predetermined first favorites data and other first favorites data specified in the first process are used for generating second favorites data.

Furthermore, to attain the above object, a second aspect of the present invention includes a first step for specifying other first favorites data indicating same contents as those indicated by predetermined first favorites data among a plurality of first favorites data respectively indicating contents favored by respective users defined by corresponding to the respective users; and a second step for generating second favorites data by using the predetermined first favorites data and the other first favorites data specified in the first step.

Furthermore, to attain the above object, a third aspect of the present invention comprises a specifying portion for specifying other first favorites data indicating same contents as those indicated by predetermined first favorites data among a plurality of first favorites data respectively indicating contents favored by respective users defined by corresponding to the respective users; and a favorites data generation portion for generating second favorites data by using the predetermined first favorites data and the other first favorites data specified by the specifying portion.

BRIEF DESCRIPTION OF DRAWINGS

FIG. 6A, FIG. 6B and FIG. 6C are views for explaining an operation of a recommendation list generation portion of the data processing apparatus shown in FIG. 2.

FIG. 9A, FIG. 9B and FIG. 9C are views for explaining an operation of a recommendation list generation portion in a second embodiment of the data processing apparatus according to the present invention.

BEST MODE FOR CARRYING OUT THE INVENTION

Figure 1:
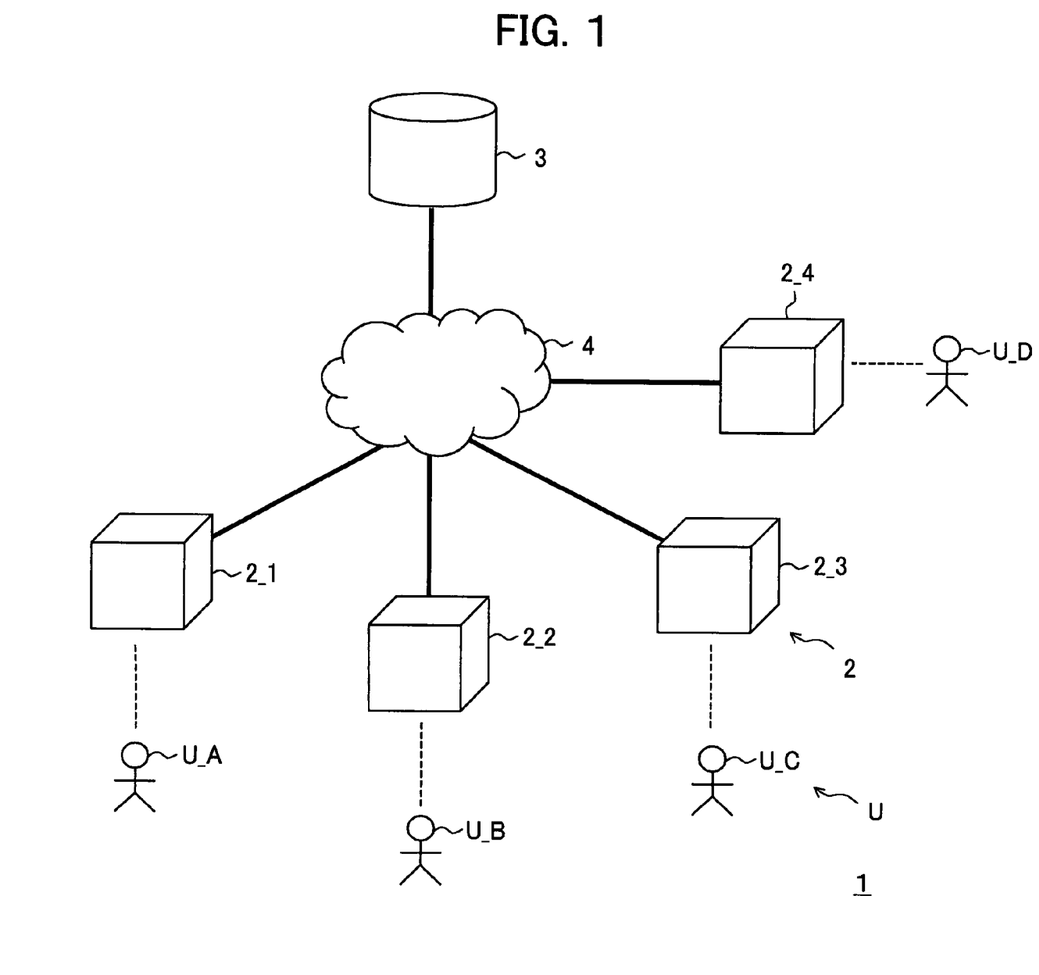
FIG. 1 is a view of the overall configuration showing a first embodiment of a data processing system wherein a data processing apparatus according to the present invention is applied.

FIG. 1 is a view of the overall configuration showing a first embodiment of a data processing system wherein a data processing apparatus according to the present invention is applied.

A data processing system 1 comprises, for example as shown in FIG. 1, a user terminal device 2 and a data processing apparatus 3.

The user terminal device 2 and the data processing apparatus 3 are connected by a communication network 4.

The user terminal device 2 generates a favorite content list (also referred to as a preferable content list) corresponding to first favorite data indicating preferable contents of a user "U" according to the present invention and transmits the generated favorite content list to the data processing apparatus 3 via the communication network 4, for example, in accordance with an operation by the user "U".

Also, the user terminal apparatus 2 transmits a request for a recommendation content list that highly probably fits favorites of the user "U" to the data processing apparatus 3 via the communication network 4 in accordance with an operation by the user "U".

Also, the user terminal device 2 receives and displays the recommendation content list transmitted by the data processing apparatus 3 via the communication network 4.

In detail, for example, the user terminal device 2 is capable of managing the content list of the user "U" and dealing by discriminating particularly those favored by the user "U". For example, these are managed as the above favorite content list.

For example, contents in the present embodiment are contents generally distributed and broadcasted, etc. by the communication network 4 and mass media and known by a plurality of users.

The user terminal device 2 comprises a plurality of user terminal devices, for example as shown in FIG. 1 for a simple explanation, user terminal devices 2_1 to 2_4 in the present embodiment.

For example, the user terminal devices 2_1 to 2_4 are respectively operated by users U_A to U_D as shown in FIG. 1.

The data processing apparatus 3 receives and stores favorite content lists from a plurality of user terminal devices 2 via the communication network 4.

Also, for example, when a request for the recommendation content list that highly probably fits favorites of the user "U" is received from the user terminal device 2, the data processing apparatus 3 generates a recommendation contents in accordance with the request and transmits to the user terminal device 2 operated by the user "U".

Also, the data processing apparatus 3 stores, specifically, holds as a database the favorite content list D_t transmitted from the user terminal device 2.

Also, the data processing apparatus 3 performs similar data retrieve on a favorite content list of a specific user and the database, extracts content lists of users having similar favorites, calculates a plurality of extracted content lists, calculates points for each content, sorts the contents according to the points, and sends information to the specific user.

Figure 2:
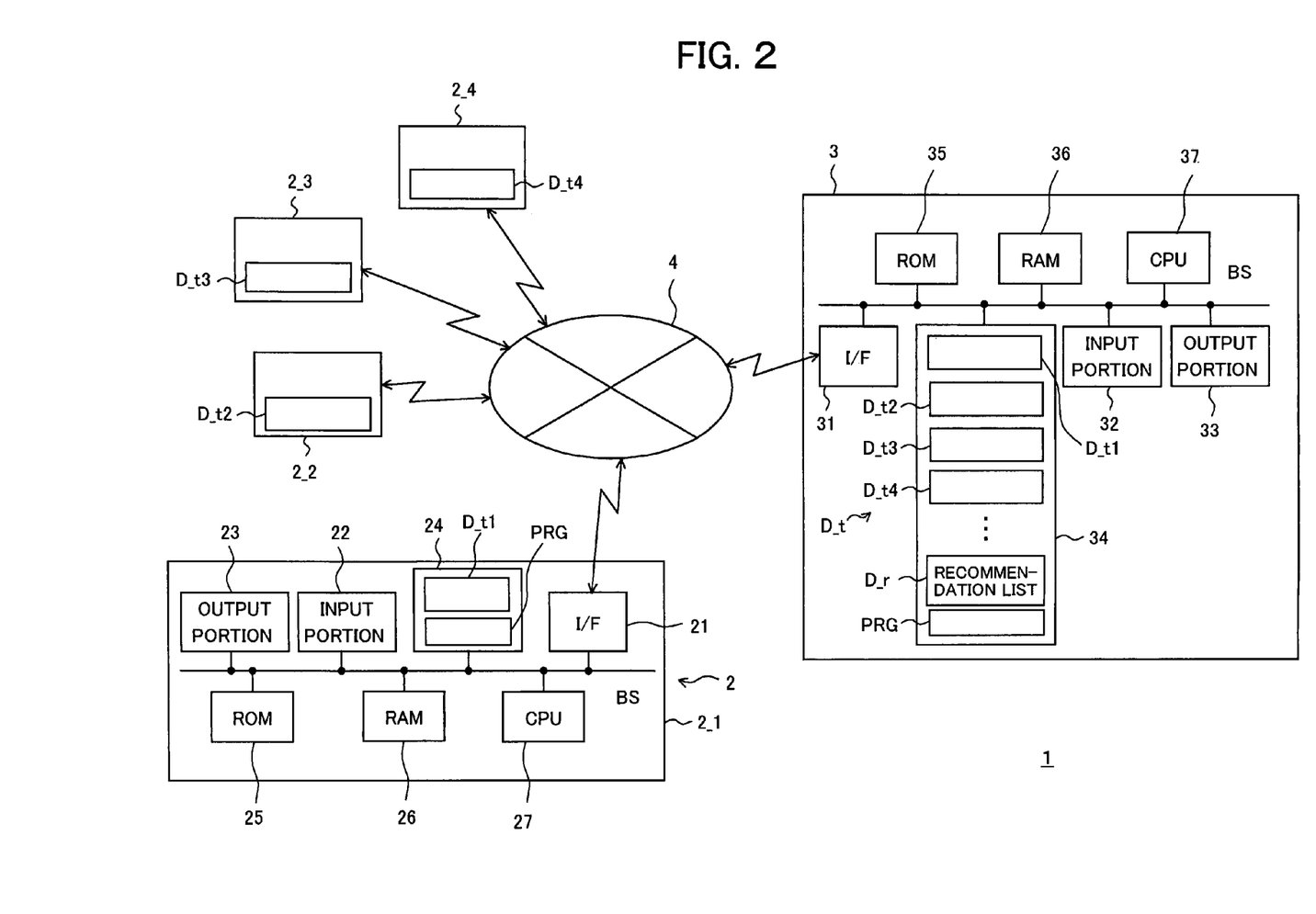
FIG. 2 is a block diagram of a hardware function of the data processing system shown in FIG. 1.

FIG. 2 is a block diagram of a hardware function of the data processing system shown in FIG. 1.

A plurality of user terminal devices 2, for example, user terminal devices 2_1 to 2_4 have the same components, respectively. They are simply referred to as a user terminal device 2 when not separately considered.

The user terminal device 2 comprises, for example as shown in FIG. 2, an interface (I/F) 21, an input portion 22, an output portion 23, a memory portion 24, a ROM (read only memory) 25, RAM (random access memory) 26, and a CPU (central processing unit) 27.

The I/F 21, input portion 22, output portion 23, memory portion 24, ROM 25, RAM 26 and CPU 27 are connected by buses BS.

The I/F 21 performs data communication with the data processing apparatus 3 via the communication network 4 by being controlled by the CPU 27.

The input portion 22 outputs a signal in accordance with, for example, an operation by a user to the CPU 27. The CPU 27 performs processing in accordance with the signal. For example, the input portion 22 is composed of input devices, such as a keyboard and mouse.

The output portion 23 displays by being controlled by the CPU 27 a predetermined image, for example, a favorite content list and recommendation content list. For example, the output portion 23 is composed of a display device, such as a display, and an output device, such as a printer.

The memory portion 24 stores predetermined data and programs, etc. by being controlled by the CPU 27. For example, the memory portion 24 is composed of a memory device, such as a hard disk drive.

The memory portion 24 stores, for example as shown in FIG. 2, a program PRG and a favorite content list D_t, etc.

The favorite content list D_t corresponds to an example of first favorite data according to the present invention.

The program PRG is executed by using the RAM 26 as a work space, for example, by control by the CPU 27 and has a function of performing processing on the user terminal 2, for example, generating a favorite content list and a function of requesting a recommendation content list and making the same displayed, etc. The CPU 27 realizes the functions by executing the program PRG.

A favorite content lists D_t are data indicating contents favored by users "U" defined by corresponding to the respective users "U".

Figure 3:
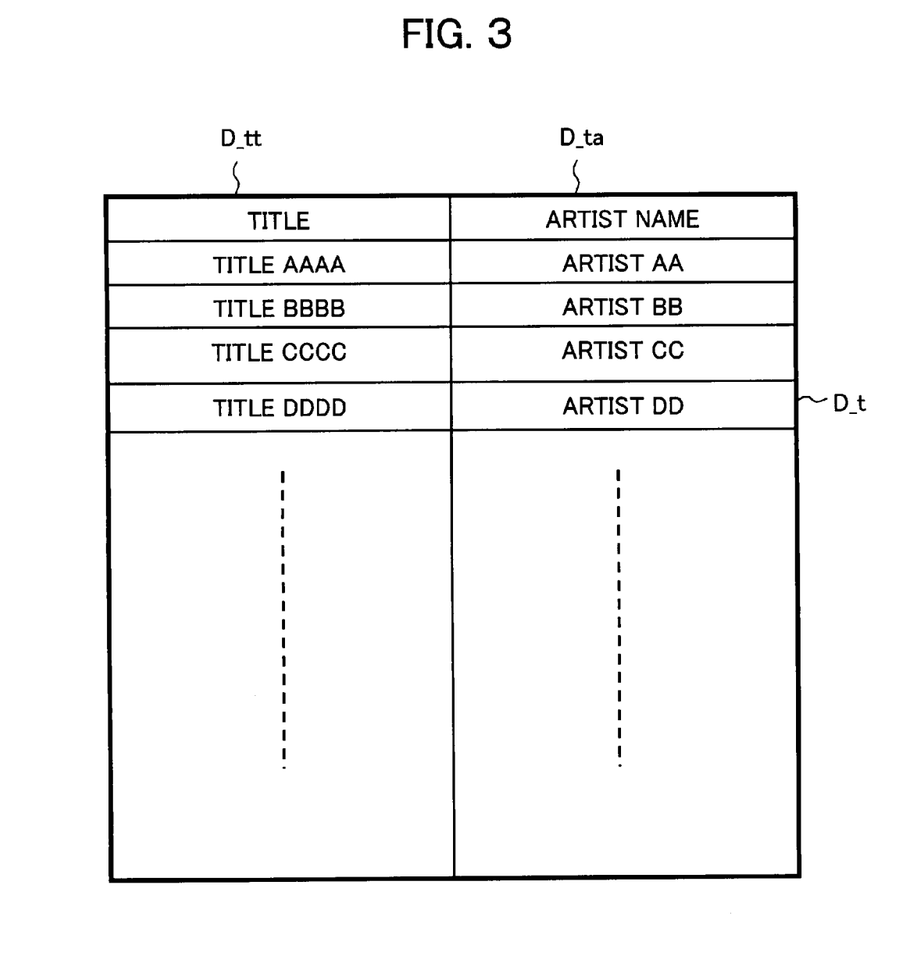
FIG. 3 is a view showing a specific example of a favorites list subjected to processing by a user terminal device and the data processing apparatus shown in FIG. 1.

FIG. 3 is a view showing a specific example of a favorites list subjected to processing by the user terminal device and the data processing apparatus shown in FIG. 1.

As contents, there are a variety of kinds, for example, music contents, image contents and movie contents, etc. In the present embodiment, a music content will be taken as an example for explanation.

For example, a favorite content list D_t of the user "U" stores information on the content, for example, meta-information as shown in FIG. 3. For example, as information on the content, a title D_tt and an artist name D_ta, etc. are included as identifiers.

The title name D_tt is data on a title indicating a favorite content, for example, a song title, etc.

The artist name D_ta is data on an artist name of the favorite content, for example, a name, etc.

The form of the favorite content D_t is not limited to the above form. A variety of information, for example, a label name may be furthermore added. Also, a director's name and a distribution company, etc. may be used as identifiers in the case of a movie content.

For example, the favorite content list D_t is data indicating contents discriminated as favorites by a user "U_A" among data indicating contents favored by the user "U_A".

For example, the favorite content list D_t of the user "U_A" is linked with a title D_tt and an artist name D_ta as shown in FIG. 3. For example, a title AAAA, an artist AA, a title BBBB, an artist BB, a title CCCC, an artist CC, a title DDDD, an artist DD, . . . , etc. are linked, respectively.

The ROM 25 stores, for example, a variety of initial parameters and initial data, etc., which are read by the CPU 27 and used for predetermined processing.

The RAM 26 is used as a work space when executing a program PRG, for example, by control by the CPU 27.

The CPU 27 executes the program PRG, for example, by using the RAM 26 as a work space as explained above.

The CPU 27 generates a favorite content list D_t, for example, based on a signal in accordance with an operation by the user "U" input from the input portion 22, and makes the I/F 21 output the favorite content list D_t from the data processing apparatus 3 via the communication network 4.

Also, the CPU 27 makes a recommendation content list received by the I/F 21 output to the output portion 23 for displaying.

The data processing apparatus 3 comprises, for example as shown in FIG. 2, an I/F 31, an input portion 32, an output portion 33, a memory portion 34, a ROM 35, a RAM 36 and a CPU 37. The I/F 31, input portion 32, output portion 33, memory portion 34, ROM 35, RAM 36 and CPU 37 are connected by buses BS.

Components of the data processing apparatus 3 have substantially the same configuration as that in the components of the user terminal device 2.

The I/F 31 performs data communication with a plurality of user terminal devices 2, for example, user terminal devices 2_1 to 2_4 via the communication network by being controlled by the CPU 37.

The input portion 32 outputs, for example, a signal in accordance with an operation by a user to the CPU 37. The CPU 37 performs processing in accordance with the signal. For example, the input portion 32 is composed of input devices, such as a keyboard and a mouse, etc.

The output portion 33 displays a predetermined image by control by the CPU 37. For example, the output portion 33 is composed of a display device, such as a display, and an output device, such as a printer, etc.

The memory portion 34 stores predetermined data and programs, etc. by control by the CPU 37. For example, the memory portion 34 is composed of a memory device, such as a hard disk drive.

The memory portion 34 stores, for example, a plurality of favorite content lists D_t, for example, favorite content lists D_t1 to D_t4 respectively corresponding to users U_A, U_B, U_C and U_D, a recommendation content list D_r and a programs PRG, etc. The recommendation content list D_r corresponds to an example of second favorites data according to the present invention.

The favorite content list D_t is a favorite content list of each user "U", for example, transmitted from the user terminal device 2. The CPU 37 manages favorite content lists D_t for respective users "U" when the user terminal device 2 is shared by a plurality of users "U".

The recommendation content list D_r is generated by the CPU 37 and is favorites data, for example, indicating contents to be recommended to a specific user.

The program PRG is executed by using the RAM 36 as a work space, for example, by being controlled by the CPU 37 and has a function of performing processing on the data processing apparatus 3, for example, generating a recommendation content list D_r and a function of, in accordance with a request for a recommendation content list from the user terminal device 2, outputting the recommendation content list D_r to the requested user terminal device.

The ROM 35 stores, for example, a variety of initial parameters and initial data, etc., and the stored data is read by the CPU 37 and used for predetermined processing.

The RAM 36 is used as a work space for executing a program PRG, for example, by control by the CPU 37.

The CPU 37 controls the I/F 31, input portion 32, output portion 33, memory portion 34, ROM 35 and RAM 36, etc.

For example, the CPU 37 makes the memory 34 store a favorite content list D_t received by the I/F 31.

Figure 4:
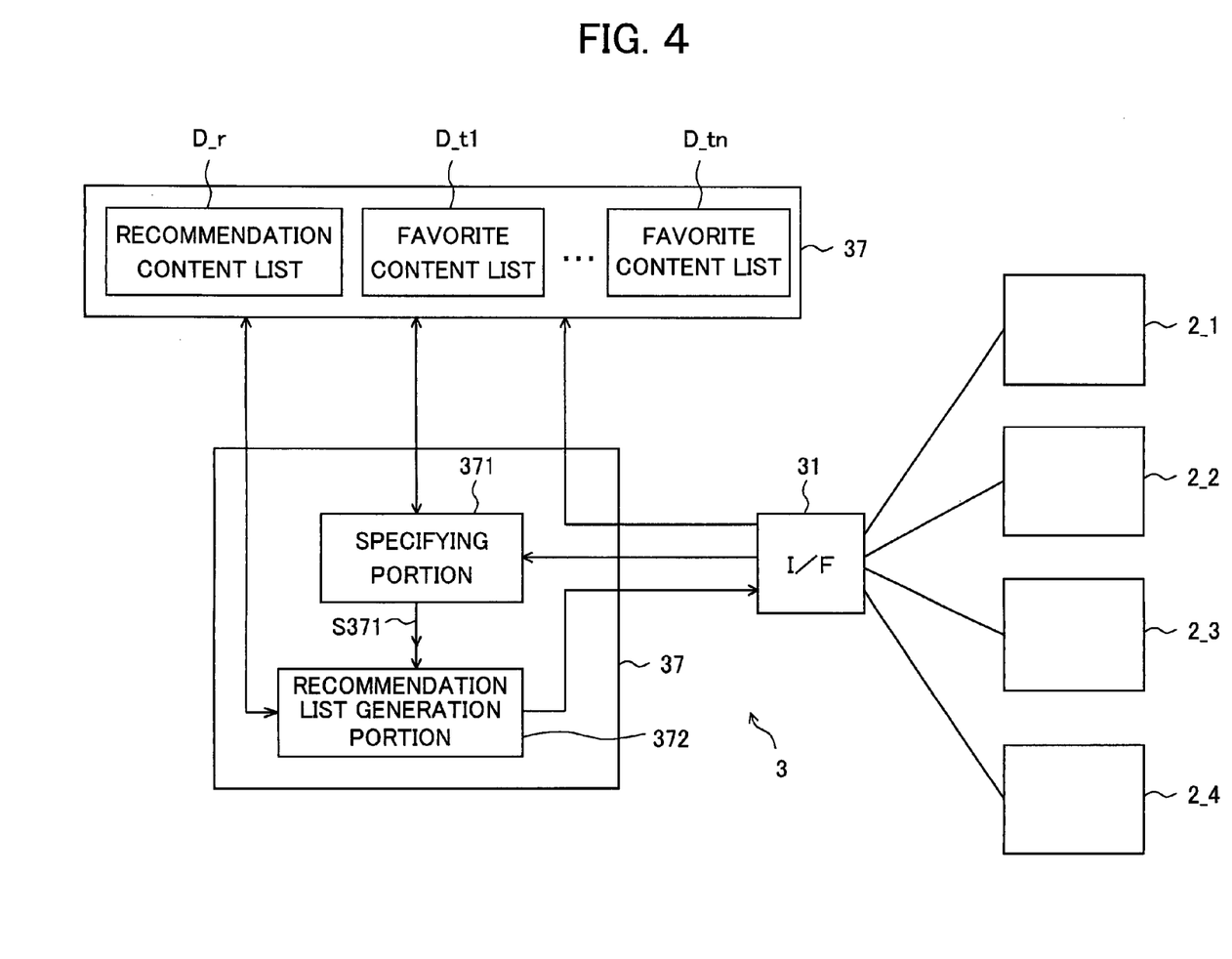
FIG. 4 is a block diagram of a function of the data processing apparatus shown in FIG. 1.

FIG. 4 is a block diagram of a function of the data processing apparatus shown in FIG. 1.

The CPU 37 executes, for example, a program PRG to realize functions of a specifying portion 371 and a recommendation list generation portion 372, for example as shown in FIG. 4.

The specifying portion 371 corresponds to an example of a specifying portion according to the present invention, and the recommendation list generation portion 372 corresponds to an example of a favorite-data generation portion.

The specifying portion 371 specifies other first favorites data indicating same contents as those indicated by predetermined first favorites data among a plurality of first favorites data respectively indicating contents favored by respective users defined corresponding to the respective users "U", and outputs data indicating the result as a signal S371 to the recommendation list generation portion 372.

For example, in detail, the specifying portion 371 specifies other user's favorite contents lists D_t indicating same contents as those indicated, for example, by a favorite content list D_t1 of a user U_A among a plurality of favorite content lists respectively indicating contents favored by respective users "U" defined corresponding to the respective users, and outputs data indicating the result as a signal D371 to the recommendation list generation portion 372.

The recommendation list generation portion 372 generates second favorites data by using the predetermined first favorites data and the signal S371 indicating other first favorites data specified by the specifying portion 371.

For example, in detail, the recommendation list generation portion 372 generates a recommendation content list D_r by using the favorite content list D_t1 of the user "U_A" and favorite content lists D_t of other users "U" specified by the specifying portion 371.

Also, the recommendation list generation portion 372 ranks contents indicated by predetermined first favorites data and other first favorites data specified by the specifying portion 371 based on respective numbers thereof, and generates second favorites data based on the ranking result.

For example, in detail, the recommendation list generation portion 372 ranks contents indicated by the favorite content list D_t1 of the user "U_A" and favorite content lists D_t of other users specified by the specifying portion 371 based on numbers thereof, and generates a recommendation content list D_r of the user "U_A".

Also, when the I/F 31 receives a request for a recommendation content list from a user terminal device 2 operated by a user "U", the recommendation list generation portion 372 makes the I/F 31 to output a recommendation content list D_r for the user to the requested user terminal device 2 via the communication network 4.

Also, the recommendation list generation portion 372 makes the memory portion 34 store the recommendation content list D_r for the user.

Figure 5:
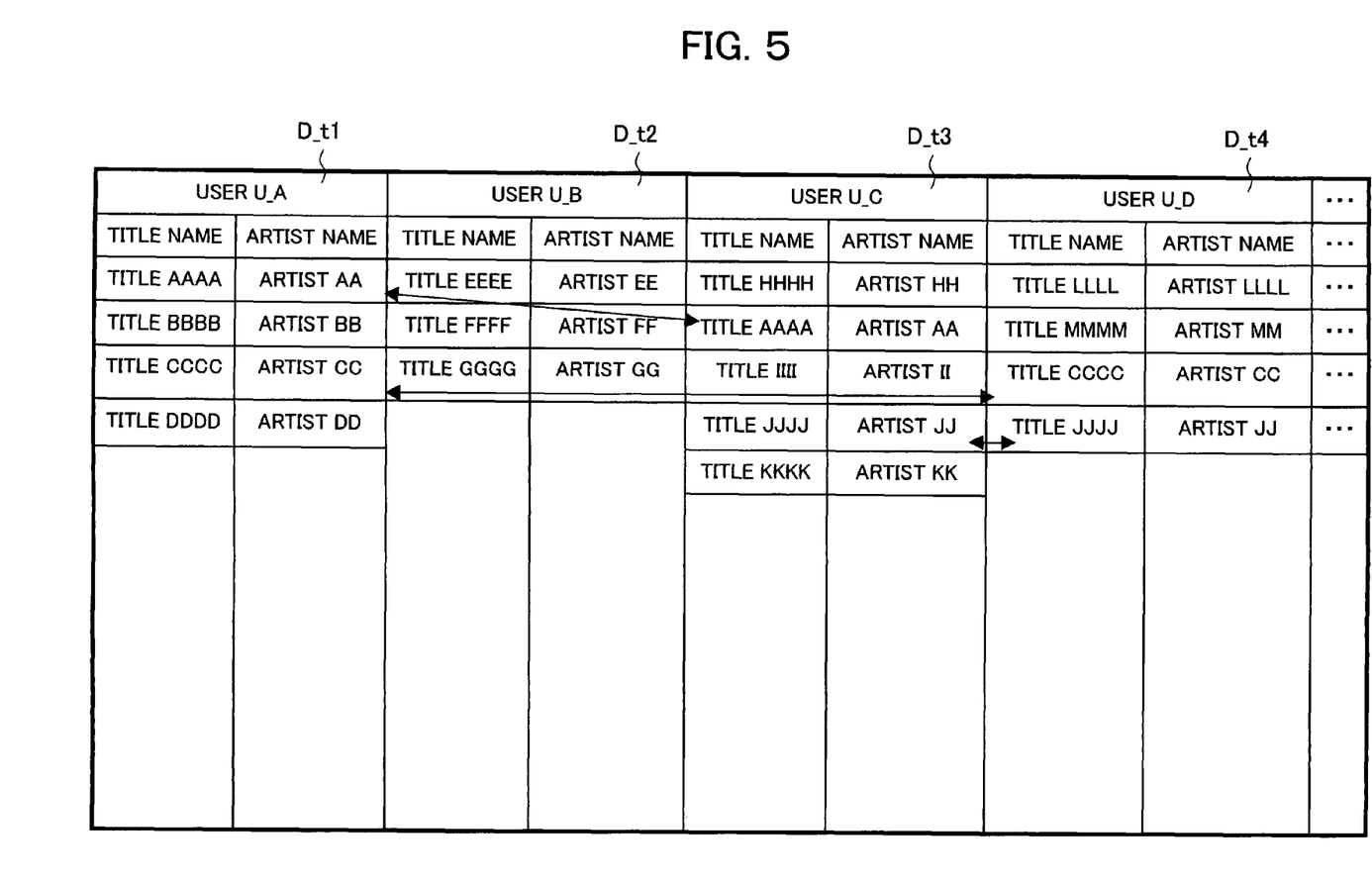
FIG. 5 is a view for explaining an operation of a specifying portion of the data processing apparatus shown in FIG. 4.

FIG. 5 is a view for explaining an operation of the specifying portion of the data processing apparatus shown in FIG. 4.

The memory portion 34 stores favorite content lists of respective users "U". For example, as shown in FIG. 5, the memory 34 stores favorite content lists D_t1 to D_t4 of users U_A to U_D.

In detail, for example, the favorite content list D_t1 of the user U_A stores by linking a title AAAA, an artist AA, a title BBBB, an artist BB, a title CCCC, an artist CC, a title DDDD, an artist DD, . . . , etc. as shown in FIG. 5.

For example, in a favorite content list D_t2 of a user U_B, as shown in FIG. 5, a title EEEE, an artist EE, a title FFFF, an artist FF, a title GGGG and an artist GG are linked to be stored.

For example, in a favorite content list D_t3 of a user U_C, as shown in FIG. 5, a title HHHH, an artist HH, a title AAAA, an artist AA, a title IIII, an artist II, a title JJJJ, an artist JJ, a title KKKK and an artist KK are linked to be stored.

For example, in a favorite content list D_t4 of a user U_D, as shown in FIG. 5, a title LLLL, an artist LL, a title MMMM, an artist MM, a title CCCC, an artist CC, a title JJJJ and an artist JJ are linked to be stored.

In the case where, for example, the memory portion 34 stores a plurality of favorite content lists D_t as shown in FIG. 5, for example, when generating a recommendation content list for the user U_A, the specifying portion 371 specifies other user's favorite content lists D_t indicating same contents as those indicated by the favorite content list D_t1.

In detail, the specifying portion 371 specifies and extracts contents indicated by the favorite content list D_t1, the favorite content list D_t3 of the user U_C indicating the same contents as the title AAAA and artist AA, and a favorite content list D_t4 of the user U_D indicating the same contents as the title CCCC and artist CC; and outputs a signal S371 indicating the results to the recommendation list generation portion 372.

At this time, the specifying portion 371 does not extracts the favorite content list D_t2 of the user U_B, because contents indicated thereby do not include contents indicated by the favorite content list D_t1 of the user U_A.

Figure 6A:
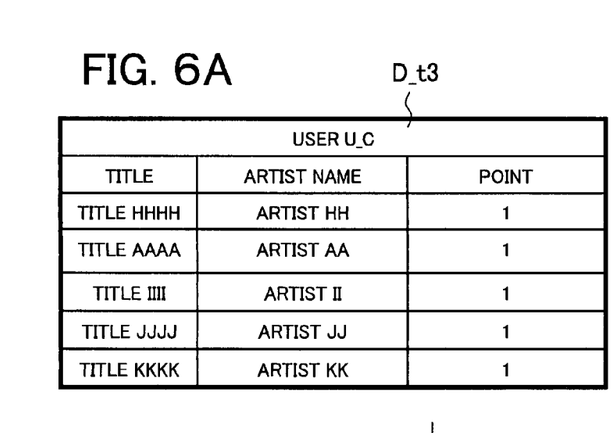
FIG. 6A is a view of a specific example of a favorite content list D_t3.
Figure 6B:
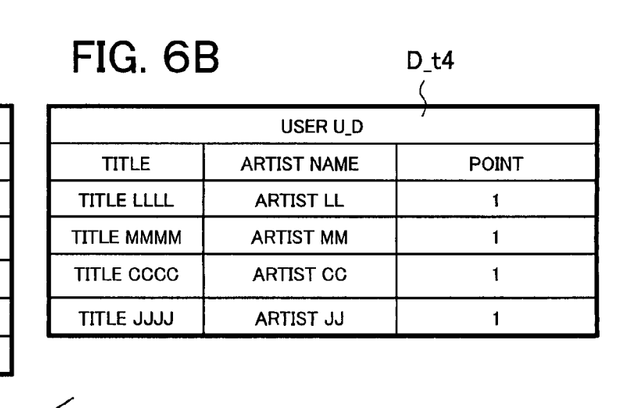
FIG. 6B is a view of a specific example of a favorite content list D_t4.
Figure 6C:
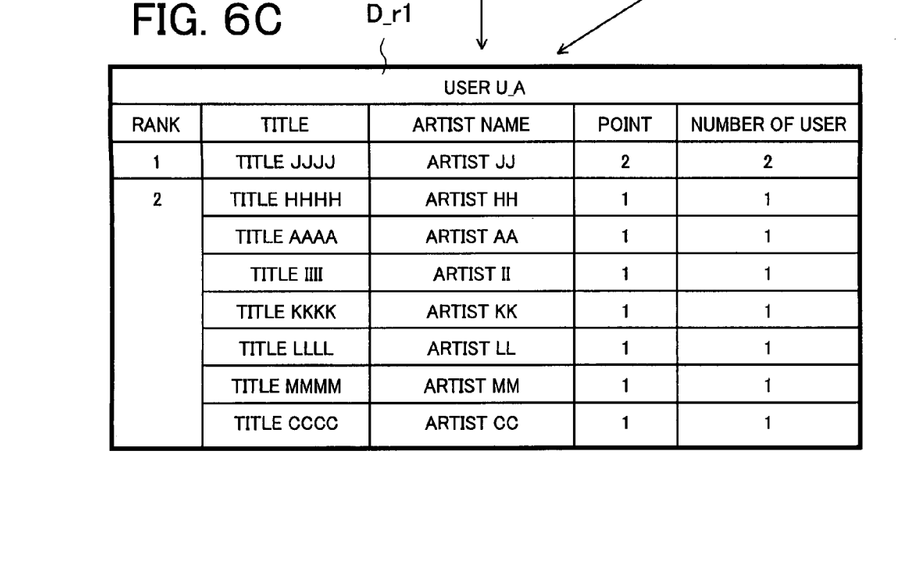
FIG. 6C is a specific example of a recommendation content list D_r1.

FIG. 6A, FIG. 6B and FIG. 6C are views for explaining an operation of the recommendation list generation portion of the data processing apparatus shown in FIG. 2.

The recommendation list generation portion 372 generates a recommendation content list D_r1 of the user U_A, for example, based on the signal S371 indicating the result of specifying processing by the specifying portion 371.

In detail, for example, the recommendation list generation portion 372 assigns numbers of respective contents indicated by the favorite content list D_t3 of the user U_C and the favorite content list_t4 of the user U_D specified by the specifying portion 371, respectively. For example, a predetermined point, for example, 1 point as shown in FIG. 6A and FIG. 6B is assigned to each content.

The recommendation list generation portion 372 ranks respective contents based on the points respectively assigned to the contents. In detail, for example as shown in FIG. 6C, contents with much points are set at high ranks, and a recommendation content list D_r1 is generated based on the result.

In the case of data shown in FIG. 6C, since the title JJJJ and artist JJ have much points as 2 and other contents have 1 point, a recommendation content list D_r1 is generated by setting the title JJJJ and artist JJ to be ranked first and other contents to be ranked second.

Figure 7:
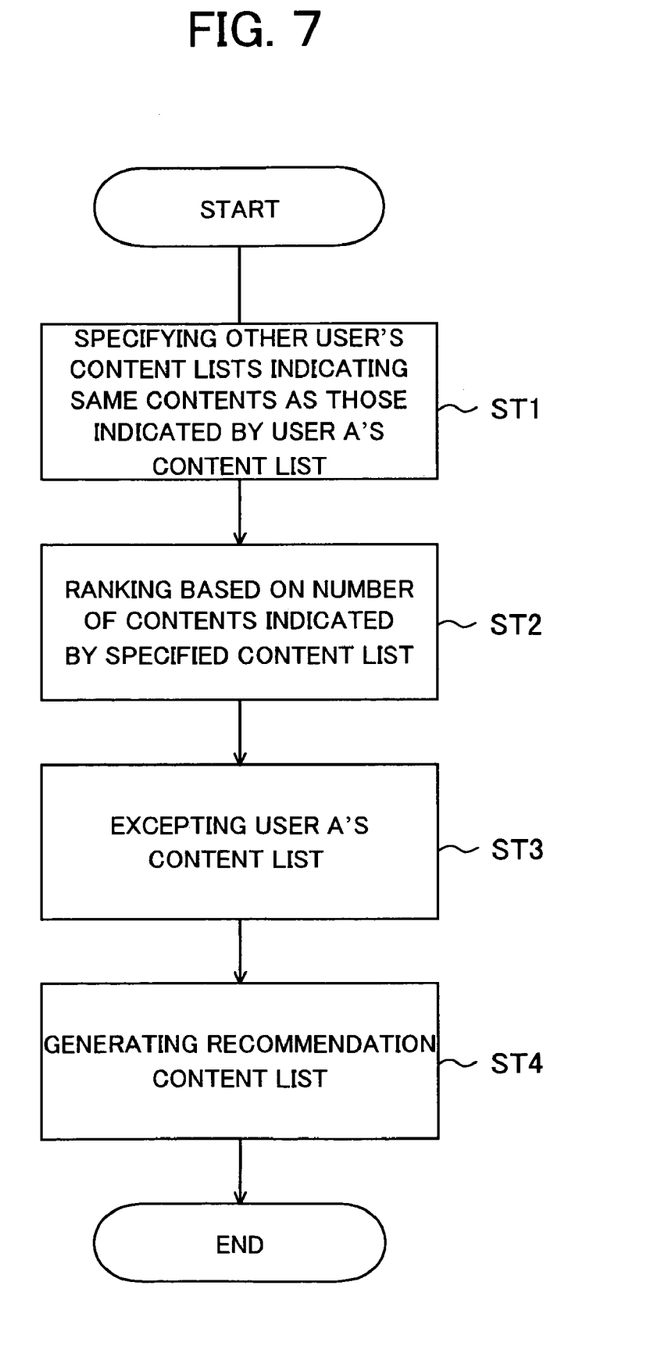
FIG. 7 is a view for explaining an operation of the data processing apparatus shown in FIG. 1.

FIG. 7 is a view for explaining an operation of the data processing apparatus shown in FIG. 1. With reference to FIG. 7, an operation of the data processing apparatus 3 and particularly generation processing of a recommendation content list D_r will be explained by focusing on an operation of the CPU 37.

In a step ST1, for example, when the I/F 31 receives a request for a recommendation content list of the user U_A, the specifying portion 371 specifies favorite content lists of other users "U" indicating same content as those indicated by the favorite content list D_t1 of the user U_A among favorite content lists D_t of respective users "U" defined corresponding to the respective uses "U", and outputs data indicating the result as a signal S371 to the recommendation list generation portion 372.

In a step ST2, in the recommendation list generation portion 372, by using the favorite content list D_t1 of the user U_A and the favorite content lists of other users "U" specified by the specifying portion 371 from the signal S371, as explained above, respective contents indicated by the favorite content lists D_t are ranked based on respective numbers of the contents.

In a step ST3, for example, in the recommendation list generation portion 372, for example, contents indicated by the favorite content list D_t1 of the user U_A may be excepted. By doing so, a recommendation content list excepting contents indicated by the favorite content list D_t1 of the user U_A can be generated. The excepting processing in the step ST3 may be performed in accordance with need.

In a step ST4, the recommendation list generation portion 372 generates a favorite content list D_r of the user U_A based on the result of ranking explained above, and makes the I/F 31 output the same from the user terminal device 2_1 operated by the user U_A as a requested source via the communication network 4.

Figure 8:
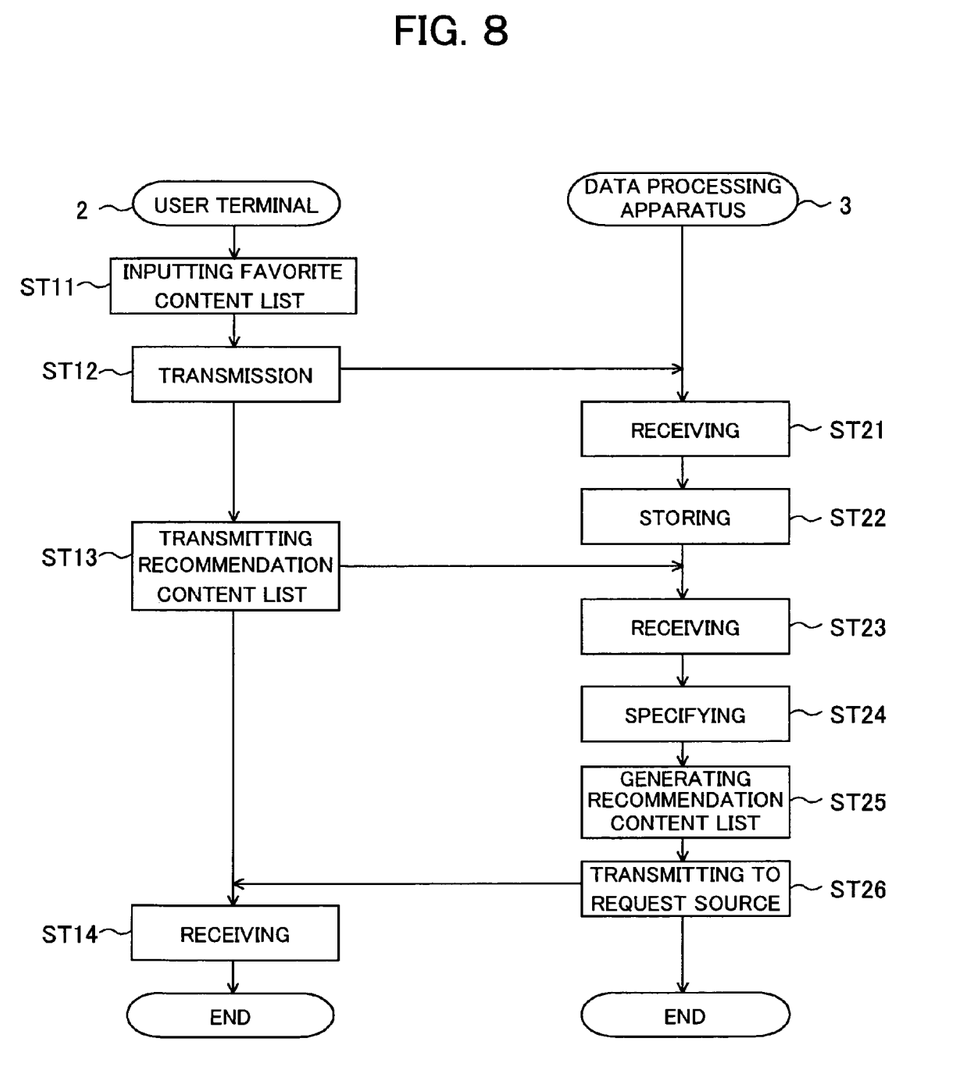
FIG. 8 is a view for explaining an operation of a data processing system wherein the data processing apparatus shown in FIG. 1 is applied.

FIG. 8 is a view for explaining an operation of the data processing system wherein the data processing apparatus shown in FIG. 1 is applied. With reference to FIG. 8, an operation of the data processing system will be explained plainly.

In a step ST11, each of the user terminal devices 2_1, 2_2 and 2_3 receives by the input portion 22 each of favorite content lists D_t indicating favorite contents in accordance with an operation of each of the users U_A, U_B and U_C. The CPU 27 makes the memory portion 24 store the favorite content lists D_t for registration.

In a step ST12, in each of the user terminal devices 2_1, 2_2 and 2_3, when the above favorite content lists D_t are registered (or updated), the CPU 27 makes the I/F 21 transmit the favorite content lists D_t to the data processing apparatus 3 via the communication network 4.

In a step S21, in the data processing apparatus 3, when the I/F 31 receives the favorite content lists D_t, the CPU 37 makes the memory portion 34 store the same and creates a database of favorite content lists of all users "U" (step ST22).

In a step ST13, for example, by an operation by the user U_A, when the input portion 22 receives data indicating a request for displaying recommendation contents of the user U_A, the CPU 27 makes the I/F 21 transmit data indicating the request for the recommendation contents of the user U_A from the data processing apparatus 3 via the communication network 4.

In a step ST23, when the I/F 31 of the data processing apparatus 3 receives data indicating the request for the recommendation contents of the user U_A, the specifying portion 371 specifies favorite content lists of other users "U" indicating the same contents as those indicated by the favorite content list D_t1 of the user U_A among favorite content lists D_t of respective users "U" defined corresponding to the respective users "U", and outputs data indicating the result as a signal S371 to the recommendation list generation portion 372 (ST24).

In a step ST25, in the recommendation list generation portion 372, by using the favorite content list D_t1 of the user U_A and the favorite content lists of other users "U" specified by the specifying portion 371 by the signal S371, as explained above, the respective contents indicated by the favorite content list D_t are ranked based on respective numbers of the contents, and if necessary, contents indicated by the favorite content list D_t1 of the user U_A is excepted to generate a recommendation content list D_r1 of the user U_A (ST25).

In a step ST26, in the recommendation list generation portion 372, the I/F 31 is made to output the generated recommendation content list D_r1 to the user terminal device 2_1 operated by the user U_A as a requested source via the communication network 4.

In a step ST14, when the I/F 21 receives the recommendation content list D_r1, the CPU 27 of the user terminal device 2_1 operated by the user U_A makes, for example, a display of the output portion 23 display an image in accordance with the recommendation content list.

As explained above, as a result of providing the specifying portion 371 for specifying favorite content lists of other users "U" indicating the same contents as, for example, those indicated by the favorite content list D_t1 of the user U_A among a plurality of favorite content lists D_t respectively indicating contents favored by respective users "U" defined corresponding to the respective users; and the recommendation list generation portion 372 for ranking respective contents indicated by the favorite content lists D_t of other users based on respective numbers of the contents by using the favorite content list D_t1 of the user U_A and the favorite content lists D_t of other users "U" specified by the specifying portion 371, and generating a recommendation content list D_r1 of the user U_A based on the result of the ranking; it is possible to provide data indicating contents favored by a user, for example, a recommendation content list, which cannot be perceived by attributes, such as the user's own operation history, etc.

In the present embodiment, a recommendation contents are generated based not only on attributes of the user's own, but on data indicating other users' favorites which are the same as the user's own favorites, specifically, favorite content lists D_t of other users, so that a recommendation content list D_r reflecting latent favorites of the user can be generated.

For example, it is possible to provide a recommendation content list reflecting latent favorites, that is not recognized by a specific user "U" as own favorites but may highly probably fit the preferences of the user "U".

A data processing system 1a including a data processing apparatus 3a according to a second embodiment of the present invention comprises a not shown user terminal device 2 and the data processing apparatus 3a.

The data processing system 1a according to the second embodiment has substantially the same configuration as that of the first embodiment, and the same reference numbers are given to the same components and only different points will be explained.

The data processing apparatus 3a has a different ranking method comparing with that in the data processing apparatus 3 of the first embodiment, which will be explained in detail below.

The data processing apparatus 3a comprises a not shown I/F 31, an input portion 32, an output portion 33, a memory portion 34, a ROM 35, a RAM 36 and a CPU 37a.

The CPU 37a comprises, for example, a specifying portion 371 and a recommendation list generation portion 372a.

The recommendation list generation portion 372a uses a favorite content list D_t of a predetermined user "U" and a signal S371 indicating favorite content lists D_t of other users "U" specified by the specifying portion 371 to assign points being in inverse proportion to the total number of contents indicated by the favorite content list D_t to the contents indicated by the favorite content list D_t for every favorite content list D_t of other users "U", ranks based on the assigned points, and generates a recommendation content data D_r of a predetermined user "U".

Figure 9A:
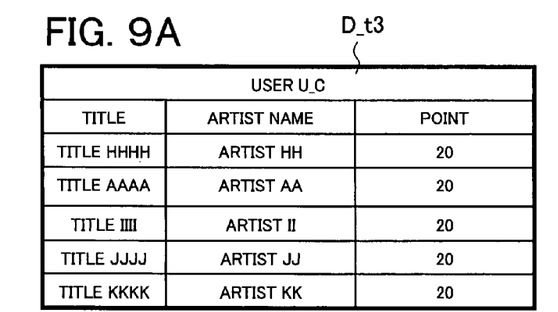
FIG. 9A is a view showing a specific example of a favorite content list D_t3.
Figure 9B:
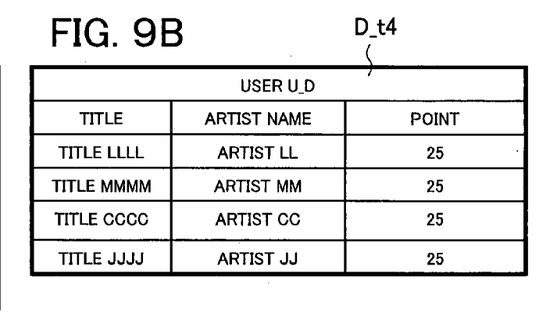
FIG. 9B is a view of a specific example of a favorite content list D_t4.
Figure 9C:
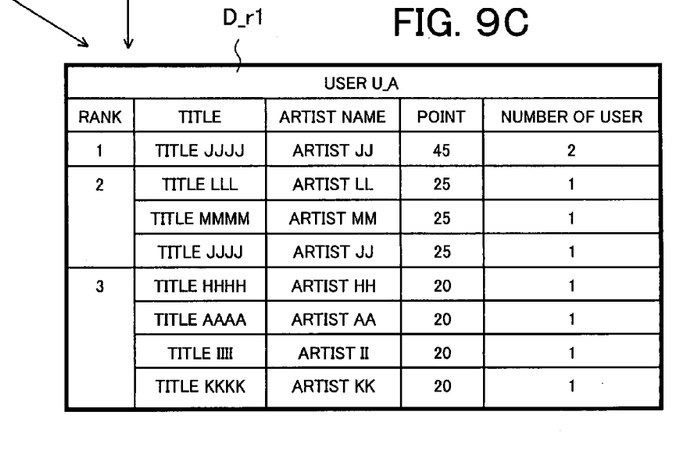
FIG. 9C is a specific example of a recommendation content list D_r1.

FIG. 9A, FIG. 9B and FIG. 9C are views for explaining an operation of the recommendation list generation portion of the second embodiment of the data processing apparatus according to the present invention.

The recommendation list generation portion 372a generates a recommendation content list D_r1 of a user U_A, for example, based on a signal S371 indicating a result of the specifying processing of the specifying portion 371.

In detail, for example, a recommendation list generation portion 372a sets predetermined points, for example, 100 points to each of a favorite content list D_t3 of a user U_C and the favorite content lists D_t4 of a user U_D specified by the specifying portion 371.

The recommendation list generation portion 372a divides points of contents indicated by a favorite content list by a total number of the contents, assigns the division result to the respective contents, and ranks based on points of the contents indicated by a favorite content list D_1 of a user "U" specified by the specifying portion 371.

Namely, for every favorite content list D_t of other user "U" specified by the specifying portion 371, the recommendation list generation portion 372a assigns points being in inverse proportion to the total number of contents indicated by the favorite content list D_t to respective contents indicated by the favorite content list D_t, ranks respective contents indicated by the favorite contents D_t of other users "U" specified by the specifying portion 371 based on the assigned points, and generates a recommendation content list D_r based on the ranking results.

The recommendation list generation portion 372a assigns, for example, 100 points to the favorite content list D_t3 of the user U_C, for example as shown in FIG. 9A, and assigns 20 points obtained by dividing by the total number 5 of the contents indicated by the favorite content list D_t3 to the respective contents.

Also, the recommendation list generation portion 372a assigns, for example, 100 points to the favorite content list D_t4 of the user U_D, and assigns 25 points obtained by dividing the total number 4 of the contents indicated by the favorite content list D_t4 to the respective contents.

Specifically, for example as shown in FIG. 9C, the recommendation list generation portion 372a sets contents with much points at high ranks based on the points assigned to the respective contents, and generates a recommendation content list D_r1 based on the result.

In the case of the data shown in FIG. 9C, by two users, the title JJJJ and artist JJ are 45 points, the title LLLL, artist LL, title MMMM, artist MM, title JJJJ and artist JJ are 20 points, and other contents are 20 points, so that the content with 45 points is ranked first, contents with 25 points are ranked second, and contents with 20 points are ranked third.

The recommendation list generation portion 372a generates a recommendation content list D_r1 based on the above ranking results.

Figure 10:
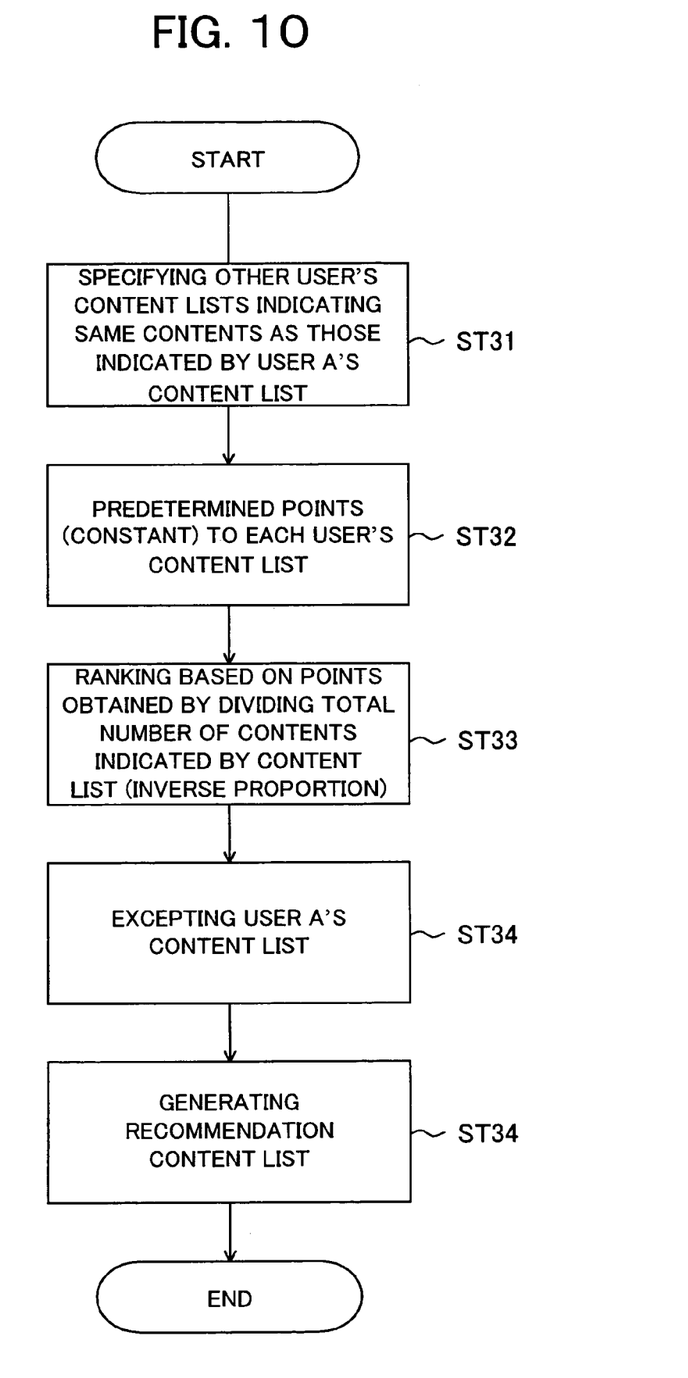
FIG. 10 is a view for explaining an operation of the second embodiment of the data processing apparatus according to the present invention.

FIG. 10 is a view for explaining an operation of the second embodiment of the data processing apparatus according to the present invention. With reference to FIG. 10, an operation of the data processing apparatus 3a and particularly generation processing of a recommendation content list D_r will be explained by focusing on an operation of the CPU 37.

In a step ST31, for example, when the I/F 31 receives a request for a recommendation content list of the user U_A, the specifying portion 371 specifies favorite content lists of other users "U" indicating the same contents as those indicated by the favorite content list D_t1 of the user U_A among favorite content lists D_t of respective users "U" defined corresponding to the respective users "U", and outputs data indicating the result as a signal S371 to the recommendation list generation portion 372a.

In a step ST32, in the recommendation list generation portion 372a, by using the favorite content list D_t1 of the user U_A and the favorite content lists of other users "U" specified by the specifying portion 371 by the signal S371, a predetermined points, for example, 100 points are set, for example, for each of the favorite content list D_t3 of the user U_C and the favorite content list D_t4 of the user U_D.

In a step ST33, the recommendation list generation portion 372a assigns, for example, 100 points to the favorite content list D_t3 of the user U_C, for example as shown in FIG. 9A, assigns 20 points obtained by dividing by the total number 5 of the contents indicated by the favorite content list D_t3 to the respective contents, and as shown in FIG. 9B, assigns, for example, 100 points to the favorite content list D_t4 of the user U_D, assigns 25 points obtained by dividing by the total number 4 of the contents indicated by the favorite content list D_t4 to the respective contents, and ranks based on the points.

Namely, points in inverse proportion to the total number in the favorite content list are assigned to the respective contents.

In a step ST34, in the recommendation list generation portion 372*a*, for example, contents indicated by the favorite content list D_t1 of the user U_A may be excepted from the ranked content list. By doing so, a recommendation content list wherein contents indicated by the favorite content list D_t1 of the user U_A are excepted can be generated. The excepting processing in the step ST 34 may be performed in accordance with need.

In the step ST34, the recommendation list generation portion 372 generates a recommendation content list D_r of the user U_A, for example, based on the above ranking results, and makes the I/F 31 output to the user terminal device 2_1 operated by the user U_A as the requested source via the communication network 4.

As explained above, in the second embodiment, as a result of providing a recommendation list generation portion 372*a*, wherein, for every favorite content list D_t of others user "U" specified by the specifying portion 371, points being in inverse proportion to the total number of contents indicated by the favorite content list are assigned to the respective contents indicated by the favorite content list D_t, respective contents indicated by the favorite content lists D_t of the other users "U" specified by the specifying portion 371 are ranked based on the assigned points, and a recommendation content list is generated based on the raking result; points assigned to contents indicated by the favorite content D_t of a user "U" wherein the total number of the contents indicated by the favorite content D_t is much become smaller than points assigned to contents favored by a user "U" wherein the total number of contents indicated by the favorite content D_t is small, so that contributes by the favorite contents D_t with a larger total number can be made small.

Namely, for example, in the first embodiment, there is a possibility to inappropriately operate points of a recommendation content list by increasing the number of contents indicated by the favorite content data, on the other hand, in the second embodiment, an effect of the favorite content data D_t indicating more contents can be made small, and a highly reliable recommendation content list D_r can be generated based on suitable ranking.

Note that the present invention is not limited to the present embodiments, and a variety of modifications can be freely made.

In the present embodiments, a music content was explained as an example of favorite contents, but the present invention is not limited to this. Depending on a kind of a content, information on the content, for example, meta-information is included in a favorite content list D_t.

In the present embodiments, a recommendation content list was generated and provided in accordance with a request by a user, but the present invention is not limited to this. For example, in the data processing apparatus 2, the memory portion may store contents and information indicating addresses of the contents, and based on contents indicated by a generated recommendation content list, the contents and addresses of the contents stored in the memory portion may be provided to the user terminal device as a requested source.

As explained above, according to the present invention, a program, a data processing method and a data processing apparatus, capable of providing data indicating user's favorite contents which cannot be perceived by attributes, such as user's own operation history, etc. can be provided.

INDUSTRIAL APPLICABILITY

A program, a data processing method and a data processing apparatus of the present invention can be applied to, for example, a processing apparatus for performing data processing on favorites data from a user terminal device.

EXPLANATION OF REFERENCES

1, 1*a* . . . data processing system
2, 2_1, 2_2, 2_3, 2_4 . . . user terminal device
3, 3*a* . . . data processing apparatus
4 . . . communication network
21 . . . interface (I/F)
22 . . . input portion
23 . . . output portion
24 . . . memory portion
25 . . . ROM (read only memory)
26 . . . RAM (random access memory)
27 . . . CPU (central processing unit)
31 . . . interface (I/F)
32 . . . input portion
33 . . . output portion
34 . . . memory portion
35 . . . ROM
36 . . . RAM
37 . . . CPU (central processing unit)
271 . . . specifying portion
372, 372*a* . . . recommendation list generation portion

The invention claimed is:

1. A data processing apparatus for recommending content to a user; comprising:
 a memory for storing favorite content lists created by respective users including a first user and received from a plurality of user terminal devices including the user terminal device corresponding to the first user, wherein each of the favorite content lists includes at least one content item;
 an assigning means for assigning points to the at least one content item in the favorite content list of each of the users other than the first user, wherein the assigning includes, for the favorite content list of each of the users other than the first user, dividing a same predetermined point value by a total number of content items listed in the corresponding favorite content list and assigning a quotient resulting from the dividing as an assigned point value to each of the content items in the corresponding favorite content list;
 a generating means for generating a content list specific to the first user indicating common content items by comparing the content items listed in the stored favorite content lists;
 a ranking means for ranking content items in the first user's generated content list based on the points assigned to the content items in the respective favorite content lists of users other than the first user; and
 recommendation generating means for generating a recommendation content list specific to the first user based on the ranked content items and not including the content items of the first user's favorite content list.

2. The data processing apparatus according to claim 1, further comprising transmitting means for transmitting the recommendation content list to the user terminal device corresponding to the first user.

3. A method of recommending content to a user; comprising the steps of:

storing favorite content lists created by respective users including a first user and received from a plurality of user terminal devices including the user terminal device corresponding to the first user, wherein each of the favorite content lists includes at least one content item;

assigning, by a processor, points to the at least one content item in the favorite content list of each of the users other than the first user, wherein the assigning includes, for the favorite content list of each of the users other than the first user, dividing a same predetermined point value by a total number of contents items listed in the corresponding favorite content list and assigning a quotient resulting from the dividing as an assigned point value to each of the content items in the corresponding favorite content list;

generating, by the processor, a content list specific to the first user indicating common content items by comparing the content items listed in the stored favorite content lists;

ranking, by the processor, content items in the first user's generated content list based on the points assigned to the content items in the respective favorite content lists of users other than the first user; and generating, by the processor, a recommendation content list specific to the first user based on the ranked content items and not including the content items of the first user's favorite content list.

4. The method according to claim 3, further comprising the step of transmitting the recommendation content list to the user terminal device corresponding to the first user.

5. A user terminal device including a processing unit and connected to a data processing system for recommending content to a user comprising:

transmitting means for transmitting a favorite content list including at least one content item created by a first user and a request for a recommendation content list specific to the first user to a data processing apparatus via a network; and receiving means for receiving the requested first user's recommendation content list;

wherein the first user's recommendation content list is generated by assigning points to the content in each of favorite content lists including at least one content item created by respective users other than the first user, wherein the assigning includes, for the favorite content list of each of the users other than the first user, dividing a same predetermined point value by a total number of content items listed in the corresponding favorite content list and assigning a quotient resulting from the dividing as an assigned point value to each of the content items in the corresponding favorite content list, generating a content list specific to the first user indicating common content items by comparing the content items listed in the favorite content lists, and ranking content items in the first user's generated content list based on the points assigned to the content items in the respective favorite content lists of users other than the first user, and generating the first user's recommendation content list based on the ranked content items and not including the content items of the first user's favorite content list.

6. A data processing system for recommending content to a user; comprising:

a plurality of user terminal devices including the user terminal device corresponding to a first user, each comprising:

transmitting means for transmitting a favorite content list including at least one content item and a request for a recommendation content list; and receiving means for receiving the requested recommendation content list; and a data processing apparatus connected to the plurality of user terminal devices via a network, comprising:

memory for storing favorite content lists created by respective users including the first user and received from the plurality of user terminal devices and the request received from the user terminal device corresponding to the first user;

assigning means for assigning points to the at least one content item in the favorite content list of each of the users other than the first user, wherein the assigning includes, for the favorite content list of each of the users other than the first user, dividing a same predetermined point value by a total number of content items listed in the corresponding favorite content list and assigning a quotient resulting from the dividing as an assigned point value to each of the content items in the corresponding favorite content list;

generating means for generating a content list specific to the first user indicating common content items by comparing the content items listed in the stored favorite content lists;

ranking means for ranking content items in the first user's generated content list based on the points assigned to the content items in the respective favorite content lists of users other than the first user; and recommendation generating means for generating the recommendation content list specific to the first user based on the ranked content items and not including the content items of the first user's favorite content list.

7. The data processing system according to claim 6, further comprising transmitting means for transmitting the recommendation content list to the user terminal device corresponding to the first user.

* * * * *